UNITED STATES PATENT OFFICE.

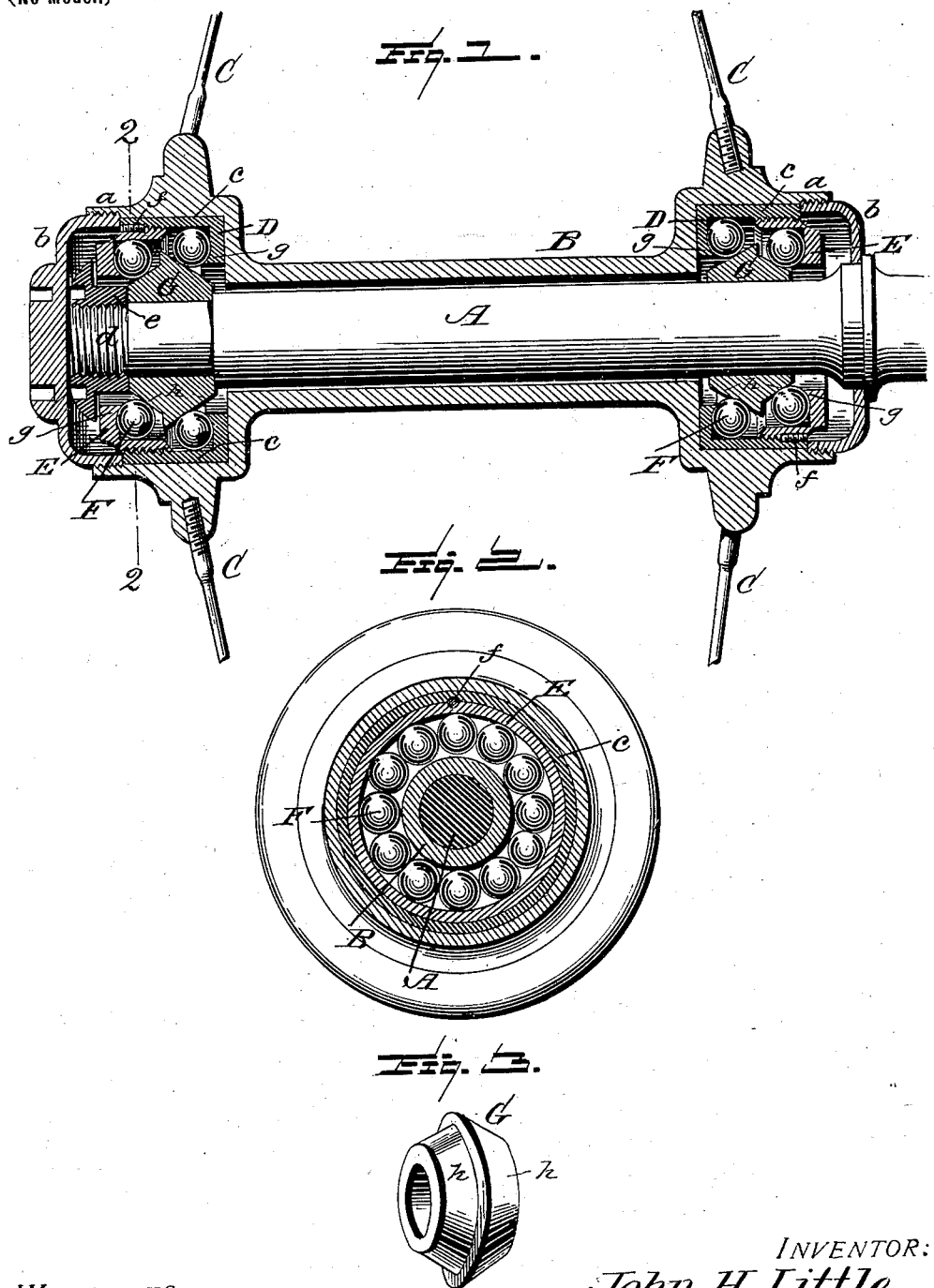

JOHN H. LITTLE, OF AMESBURY, MASSACHUSETTS.

BALL-BEARING.

SPECIFICATION forming part of Letters Patent No. 651,870, dated June 19, 1900.

Application filed April 17, 1900. Serial No. 13,187. (No model.)

*To all whom it may concern:*

Be it known that I, JOHN H. LITTLE, a citizen of the United States, residing at Amesbury, in the county of Essex and State of Massachusetts, have invented certain new and useful Improvements in Ball-Bearing Axles; and I do hereby declare that the following is a full, clear, and exact description of the same, reference being had to the annexed drawings, making a part of this specification, and to the letters of reference marked thereon.

The present invention has relation to that class of ball-bearing axles in which are employed frusto-conical bearings for the balls and means for retaining the balls against the bearings.

It is the purpose of the invention to provide a bearing that will possess increased effectiveness and render the device as a whole more desirable as a light and durable axle, which objects are attained by the construction substantially as shown in the drawings and hereinafter described and claimed.

Figure 1 of the drawings is a longitudinal vertical section of a ball-bearing axle embodying my invention, the axle or spindle proper being shown in elevation; Fig. 2, a sectional end view taken on line 2 2 of Fig. 1; Fig. 3, a detail perspective view of the double frusto-conical bearing-sleeve.

In the drawings, A represents the metal axle or spindle, to which is connected the tubular metal hub B, to which the spokes C are attached. The ends of the hub B have interiorly-screw-threaded flanges $a$ on the enlarged ends of the hub, with which engage screw-threaded caps $b$ of any suitable form and construction. A circumferential flanged support D is located in the ends of the hub B, the flange $c$ of the support having interior screw-threads to couple with an exterior screw-threaded cage E.

The usual balls F, which may be of any number desired, are located between the flanged support D and the cage E and bear against a sleeve G, extending over and upon the axle A.

The bearings and their connections are substantially alike at both ends of the axle, the outer end of the axle having a screw-threaded extension $d$ for receiving a nut $e$, which retains the sleeve G on the reduced end of the axle.

The bearing-sleeve G at the outer end of the axle is somewhat larger than the bearing-sleeve at the inner end of the axle, as shown in Fig. 1 of the drawings; but this is immaterial and may be of any size found most desirable.

The flanged supports D and the cages E are held against turning independently of each other by screw-threaded keys $f$, or any other suitable form of key may be substituted for that shown.

The bearing-sleeves are double frusto-conical in shape, the base of one frustum being greater than that of the other, thereby presenting to the balls a bearing-surface of greater circumference, whereby the two sets of balls will be on different horizontal planes, giving increased effectiveness to the bearings and greater ease in the rotation of the hub, this being considered of material importance when such a ball-bearing axle is applied to cycles and other light vehicles. It will be noticed that the supports D and the cages E have inclined rims $g$ to form seats for the balls, thereby better holding them in place. This frusto-conical bearing-sleeve has straight bearing faces or surfaces in contradistinction to the usual cup-shaped or concave surfaces for seating the balls therein, the bearing surfaces or faces, as shown at $h$ in Fig. 3 of the drawings, being perfectly straight, without any concavity, as heretofore. As will be readily seen, less frictional surface is brought in contact with the balls in having the bearing-faces perfectly straight, thereby greatly diminishing the friction and rendering the ball-bearing more effective. The double frusto-conical bearing-sleeve has an additional advantage in providing two bearing-surfaces at their base of different diameters, so that the two sets of balls will be on different planes, which still further increases the efficiency of the ball-bearing, especially when applied to the axles of cycles or light vehicles.

Having now fully described my invention, what I claim as new, and desire to secure by Letters Patent, is—

1. A double frusto-conical bearing-sleeve for ball-bearing axles, the bases being united and one of the frustums at its base being of increased diameter and the bearing surfaces or faces of each frustum being straight in contradistinction to concave, whereby the frictional contact of the bearing-surface with the balls will be greatly decreased, substantially as and for the purpose set forth.

2. A ball-bearing axle, comprising the axle proper, a metal hub therefor, double frusto-conical bearing-sleeves upon the axle, the bases being united and one of the frustums at its base being of increased diameter and both the bearing-surfaces being straight in contradistinction to concave, suitable balls, supports and cages therefor detachably connected together for holding the balls against the frusto-conical bearing-sleeves, substantially as and for the purpose described.

In testimony that I claim the above I have hereunto subscribed my name in the presence of two witnesses.

JOHN H. LITTLE.

Witnesses:
FRANK R. WHITCHER,
GEO. W. CATE.